(12) United States Patent
Beauvoir

(10) Patent No.: US 11,505,380 B2
(45) Date of Patent: Nov. 22, 2022

(54) COLLAPSIBLE CONTAINER CARRIER

(71) Applicant: Cassandra Beauvoir, Irvine, CA (US)

(72) Inventor: Cassandra Beauvoir, Irvine, CA (US)

( * ) Notice: Subject to any disclaimer, the term of this patent is extended or adjusted under 35 U.S.C. 154(b) by 446 days.

(21) Appl. No.: 16/426,802

(22) Filed: May 30, 2019

(65) Prior Publication Data

US 2020/0377275 A1    Dec. 3, 2020

(51) Int. Cl.
| | |
|---|---|
| *B65D 5/18* | (2006.01) |
| *B65D 5/36* | (2006.01) |
| *B65D 5/46* | (2006.01) |
| *B65D 71/00* | (2006.01) |
| *B65D 71/58* | (2006.01) |
| *B65D 5/468* | (2006.01) |

(52) U.S. Cl.
CPC .......... *B65D 71/0022* (2013.01); *B65D 5/18* (2013.01); *B65D 5/3678* (2013.01); *B65D 5/4608* (2013.01); *B65D 5/46184* (2013.01); *B65D 2571/0045* (2013.01); *B65D 2571/0079* (2013.01); *B65D 2571/00141* (2013.01); *B65D 2571/00382* (2013.01); *B65D 2571/00839* (2013.01)

(58) Field of Classification Search
CPC ...... B65D 5/18; B65D 5/3678; B65D 5/4608; B65D 5/46184; B65D 71/0022; B65D 2571/00141; B65D 2571/00382; B65D 2571/0045; B65D 2571/0079; B65D 2571/00839
USPC ....... 206/180, 181, 182, 183, 184, 185, 186, 206/187, 188, 189, 190, 191
See application file for complete search history.

(56) References Cited

U.S. PATENT DOCUMENTS

| | | | | | |
|---|---|---|---|---|---|
| 2,111,621 | A | * | 3/1938 | Gerking | B65D 71/0014 |
| | | | | | 206/198 |
| 2,337,197 | A | * | 12/1943 | Holy | B65D 71/004 |
| | | | | | 206/172 |
| 2,525,686 | A | * | 10/1950 | Kowal | B65D 71/0022 |
| | | | | | 206/185 |
| 2,575,654 | A | * | 11/1951 | Casler | B65D 71/0022 |
| | | | | | 206/183 |
| 2,686,003 | A | * | 8/1954 | Forrerhomerw | B65D 71/0077 |
| | | | | | 206/162 |
| 2,755,962 | A | * | 7/1956 | Ringler | B65D 71/0022 |
| | | | | | 206/184 |
| 2,755,963 | A | * | 7/1956 | Ringler | B65D 71/0022 |
| | | | | | 206/198 |
| 2,755,964 | A | | 7/1956 | Ringler | |

(Continued)

*Primary Examiner* — Joshua E Rodden
(74) *Attorney, Agent, or Firm* — Andrew Rapacke

(57) ABSTRACT

A basket-type carrier formed from a single blank of foldable sheet material and method for forming is disclosed. The carrier has a pair of handle panels, a pair of bottom panels, a pair of bottom reinforcement panels, a front panel, a back panel, side panels, side reinforcement panels, side flaps, interior partition panels, and interior partition attachment flaps. The carrier is collapsed and expanded by means of an umbrella-type mechanism wherein side flaps connected to side panels and to interior partition panels slide up and down between the handle panels. This positions front, back, side, and bottom panels in either the collapsed position with these panels folded against the handle panels, flattening the carrier for storage, or in the expanded position with these panels pulled away from the handle panels, expanding the carrier to receive articles.

21 Claims, 9 Drawing Sheets

(56) References Cited

U.S. PATENT DOCUMENTS

| | | | | |
|---|---|---|---|---|
| 2,770,391 | A | * | 11/1956 | Metzger .............. B65D 71/0022 206/187 |
| 2,850,223 | A | * | 9/1958 | Strauss .............. B65D 71/0014 229/117.14 |
| 3,229,849 | A | * | 1/1966 | Spillson .............. B65D 71/0077 206/179 |
| 3,352,452 | A | * | 11/1967 | Graser ................. B65D 71/004 206/172 |
| 3,465,913 | A | * | 9/1969 | Zorn ................. B65D 71/0022 206/172 |
| 4,171,046 | A | * | 10/1979 | Bonczyk ............ B65D 71/0022 206/193 |
| 4,362,240 | A | * | 12/1982 | Elward .............. B65D 71/0022 206/176 |
| 4,549,650 | A | * | 10/1985 | Champlin .......... B65D 71/0022 206/178 |
| 4,610,349 | A | | 9/1986 | Schwartz |
| 4,930,629 | A | | 6/1990 | Petty |
| 5,590,762 | A | * | 1/1997 | Harrelson .......... B65D 71/0022 206/162 |
| 5,695,051 | A | * | 12/1997 | Hart ................... B65D 71/0022 206/162 |
| 6,105,773 | A | | 8/2000 | Miller |
| 6,168,013 | B1 | | 1/2001 | Gomes |
| 6,341,689 | B1 | * | 1/2002 | Jones ................. B65D 71/0022 206/175 |
| 6,598,739 | B1 | | 7/2003 | Collura |
| 6,802,802 | B2 | | 10/2004 | Woog |
| 7,070,045 | B2 | | 7/2006 | Theelen |
| 7,134,547 | B2 | | 11/2006 | Auclair |
| 7,438,181 | B2 | * | 10/2008 | Cuomo ............. B65D 71/0014 206/162 |
| 8,297,437 | B2 | | 10/2012 | Smalley |
| 8,453,919 | B2 | | 6/2013 | Eckermann |
| 9,415,914 | B2 | | 8/2016 | Holley, Jr. |
| 10,858,145 | B2 | * | 12/2020 | Spivey, Sr. .............. B65D 5/02 |
| 2003/0111363 | A1 | * | 6/2003 | Theelen ............. B65D 71/0022 206/188 |
| 2004/0188278 | A1 | | 9/2004 | Krisko |
| 2005/0092623 | A1 | * | 5/2005 | Cuomo ............. B65D 71/0014 206/162 |
| 2005/0211577 | A1 | | 9/2005 | Bakx |
| 2005/0230273 | A1 | | 10/2005 | Kohler |
| 2006/0148629 | A1 | * | 7/2006 | Cuomo ............. B65D 71/0077 493/150 |
| 2010/0072086 | A1 | * | 3/2010 | Smalley ............. B65D 71/0055 206/175 |
| 2015/0321816 | A1 | * | 11/2015 | Holley, Jr. ......... B65D 71/0022 229/120.12 |
| 2018/0222649 | A1 | * | 8/2018 | Ball .................... B65D 71/0022 |
| 2020/0031548 | A1 | * | 1/2020 | Smalley ............. B65D 5/46184 |

* cited by examiner

COLLAPSIBLE CONTAINER CARRIER

BACKGROUND OF THE INVENTION

1. Technical Field

The present invention relates generally to a basket-type carrier and more particularly to a collapsible basket-type carrier.

2. Discussion of Background Art

Transporting groceries can present challenges for the consumer. Standard containers such as the half-gallon cartons and plastic bottles used as containers for milk and juice are heavier than other grocery items. They fit awkwardly with other groceries in a typical single-use or reusable grocery bag.

The present invention is a hand-held basket-type container carrier for the secure transport of such liquid-filled containers separately from other groceries, among other uses. Similar carriers have been invented to transport a number of beer bottles, wine bottles, or soft drink cans, but these carriers are not constructed to accommodate half-gallon containers. Other similar carriers have been invented to transport beverages such as individual cups of coffee or other drinks, but these carriers are not adequate for containers that are larger and heavier than cups and cannot be reliably reused. Existing container carriers generally lack the structural stability that supports effective long-term use and balanced transport for articles such as half-gallon milk or juice cartons and bottles. The existing carriers cannot be easily collapsed and expanded for storage and reuse.

The objective of the present invention is to address the issues of sturdiness, reusability, collapsibility, and ease of use of a basket-type carrier for larger-sized containers or other articles. In one embodiment, the carrier accommodates four containers that are similar in size and weight to a standard half-gallon milk carton (approximately 95 millimeters in length, 95 millimeters in width, and 242 millimeters in height, and approximately 1.8 kilograms in weight). The carrier is based on an improved design which (1) allows the carrier to be quickly collapsed to a flat state for storage and quickly expanded for use; (2) is sturdy, durable, symmetrical, balanced, compact, and convenient to use; and (3) is adaptable for other uses. The carrier in both its collapsed and expanded states is attractive in appearance. These and other benefits of one or more aspects will become apparent from a consideration of the ensuing description.

BRIEF SUMMARY OF THE INVENTION

In one aspect, the disclosure is about a reusable, collapsible basket-type carrier for holding a plurality of containers or other articles, such as liquid-filled cartons and bottles. The carrier accommodates grocery items such as standard size half-gallon cartons, plastic bottles, boxes, cans, and other articles. The carrier is assembled from a single blank that is folded and glued to provide a collapsible structure. The means of collapsing the carrier is an umbrella-type mechanism. Interior partition panels foldably connected to side panel flaps are inserted (1) between two adjacent handle panels and (2) through vertical slots in the handle panels to extend into the receptacle area of the carrier, where they are attached to front and back panels. The interior partition panels are free to slide up and down, their range of motion limited by the top and bottom ends of the vertical slots in the handle panels. As the interior partition panels slide up and down, they cause the front, back, side, and bottom panels to either collapse against the handle panels or expand away from them, depending on the direction of movement. This mechanism allows the carrier to be easily collapsed into a compact shape for storage and expanded for use. The carrier is strong, symmetrical, reusable, and easy to operate.

In one embodiment, the carrier is preferably constructed of corrugated fiberboard with a small flute size approximating the E flute. In one embodiment, length and width of the receiving compartments are preferably similar to the dimensions of a standard half-gallon milk carton.

In another aspect, the disclosure is about a blank for forming such a carrier.

In another aspect, the disclosure is about a method for forming such a carrier.

DETAILED DESCRIPTION OF THE INVENTION

All drawings are for the purpose of describing selected embodiments of the present invention and are not intended to limit the scope of the present invention. Various embodiments of the present invention may include variations in the materials from which the carrier is constructed, size and shape of the carrier, number of receptacles, number of handle slots, method of construction, various forms of laminating or printing on the surface of the carrier material, and other variations.

Figure 1:
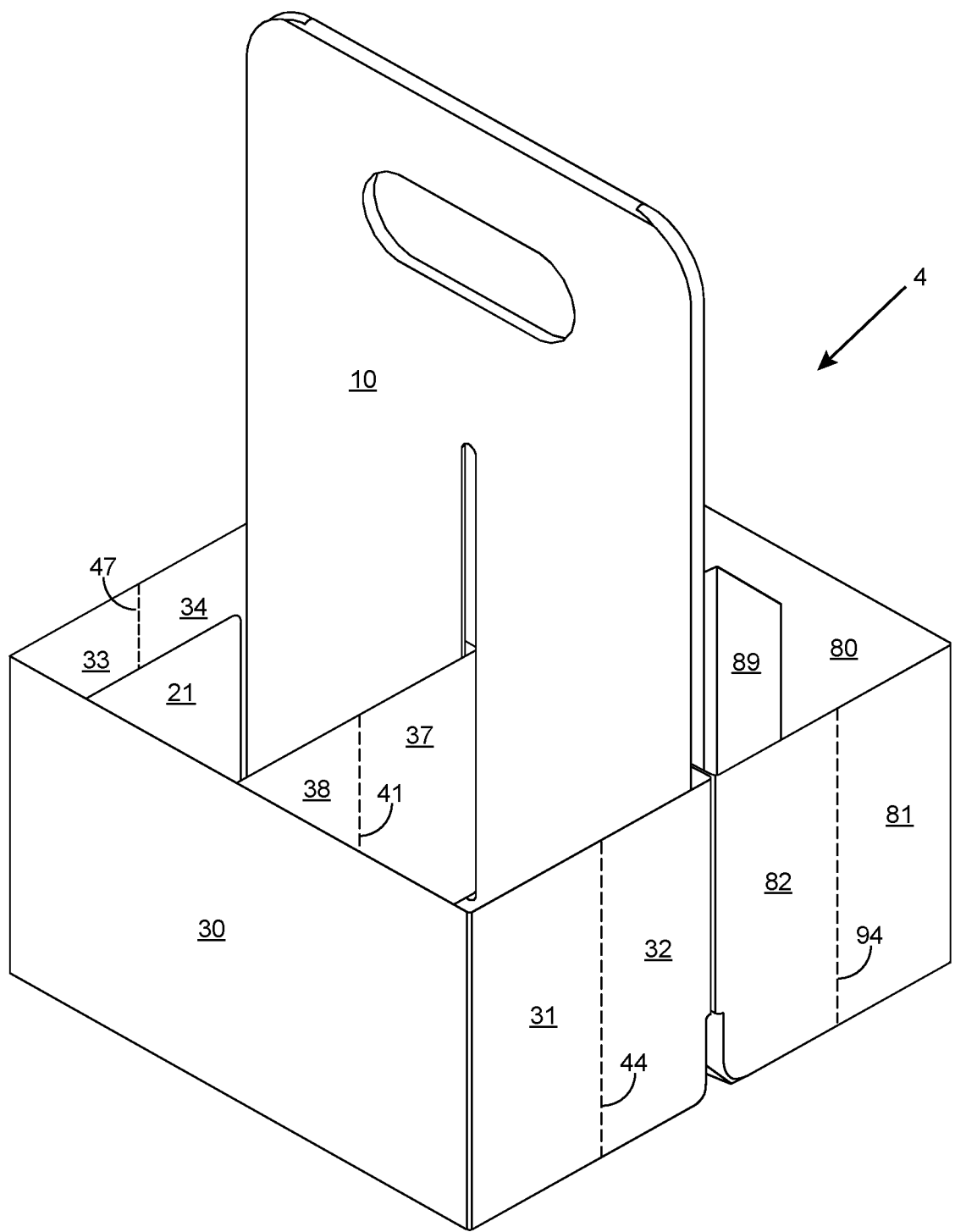
FIG. 1 is a perspective view of one embodiment of the carrier in its expanded and usable state.

For the purposes of this description, the terms "front," "back," "top," "bottom," "up," "upward," "down," "downward," "inward," "outward," "upper," "lower," "interior," "exterior," "vertical" and "horizontal" designate orientations determined in relation to the fully erected carrier 4 illustrated in FIG. 1.

Also for the purposes of this description, the term "glue" refers to any adhesive method used to hold the components of a carrier in place.

In this description, the terms "fold line," "score line," and "cut line" have specific meanings. A fold line is a line where the material of the blank is creased or weakened by pressure during manufacture to facilitate folding. A score line is a fold line where the material of the blank is partially and intermittently perforated along its length during manufacture.

Score lines do not cut through the entire thickness of the material. In an embodiment wherein the blank is formed from a plastic material, score lines may be replaced by fold lines. A cut line is a line where the material of the blank is cut through its entire thickness.

FIG. 1 is a perspective view of one embodiment of a carrier 4 in its expanded and usable state. The components of the carrier 4 illustrated in FIG. 1 are a handle panel 10; a front panel 30; a back panel 80; side panels 31, 32, 82, 81, 33 and 34; a side reinforcement panel 21; interior partition panels 38, 37, and an interior partition attachment flap 89. Also illustrated are score lines 44, 94, 41, and 47, which function to collapse the carrier. Components of carrier 4 not visible in the perspective view of FIG. 1 are shown in FIG. 2 which depicts a blank 1.

Figure 2:
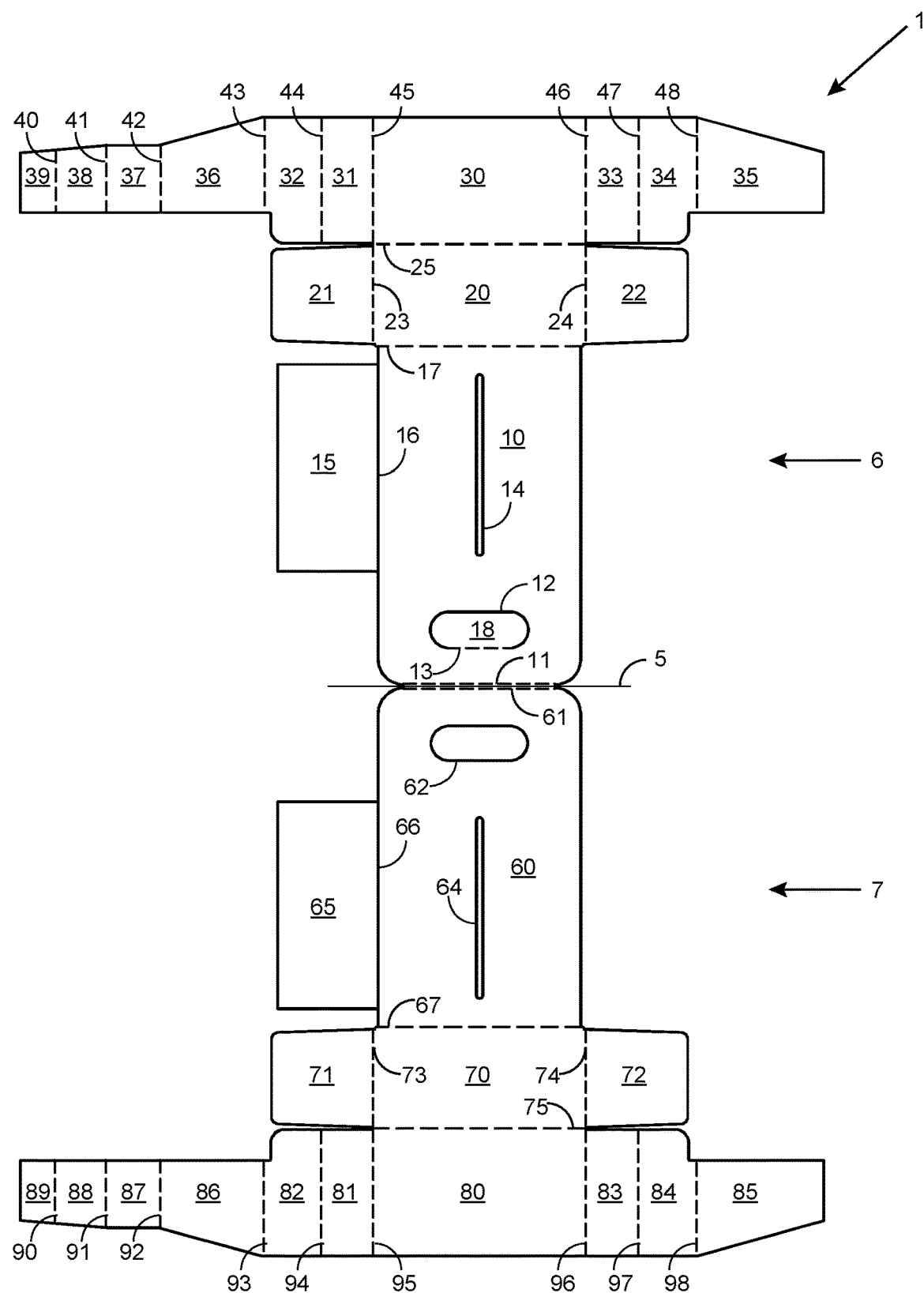
FIG. 2 is a plan view of a blank used to form the carrier according to one embodiment of the carrier.

FIG. 2 is a plan view of blank 1 used to form the carrier 4 shown in FIG. 1. When the carrier is fully erected, the surface of blank 1 depicted in FIG. 2 is the exterior surface of the front, back, and side panels of carrier 4 and the interior surface of handle panel 10 and handle panel 60. Blank 1 is die cut from corrugated fiberboard or other foldable flat material.

Blank 1 in FIG. 2 comprises a section 6 and a section 7 which reflect each other along a midline 5 situated between and parallel to a fold line 11 and a fold line 61. The single difference between section 6 and section 7 is that a hand hole 12 in section 6 is partially cut out to retain a hand guard 18, while a corresponding hand hole 62 in section 7 is completely cut out. With the exception of the hand holes 12 and 62, section 6 and section 7 are mirror images of each other reflected along midline 5. The description, folding procedures, and gluing procedures for section 6 and section 7 are similar except for the difference between hand holes 12 and 62 described previously. In the description that follows, section 6 and section 7 are described separately. In the description, aspects of assembly or operation are referenced for clarity. The complete process of assembly is described in the section "Assembly" below. Operation of the carrier is described in the section "Operation" that follows "Assembly."

Description of Section 6

Section 6 of blank 1 in FIG. 2 comprises a handle panel 10, a bottom panel 20, a front panel 30, and other components foldably connected to these main panels.

Handle panel 10 is foldably connected to a handle panel 60 of section 7 along a fold line 11 and to bottom panel 20 along a fold line 17. Fold line 11 and a fold line 61 are adjacent parallel fold lines that foldably connect the two handle panels, leaving a narrow space between the handle panels for the insertion, during assembly, of a side flap 35, a side flap 36, a side flap 85, and a side flap 86, which are foldably connected, respectively, to side panel 34, side panel 32, a side panel 84, and side panel 82.

Parallel fold lines 11 and 61 act as a hinge that allows handle panel 10 and handle panel 60 to be folded against each other during assembly. During the last steps of assembly, handle panel 10 and handle panel 60 are glued together at an area located toward their lower edges. The two handle panels extend the full height and width of the carrier, providing improved stability with their double thickness.

Handle panel 10 is also connected to a bottom reinforcement panel 15 along a cut line 16. During manufacture or assembly, bottom reinforcement panel 15 is severed from handle panel 10 along cut line 16 and glued to the surface of bottom panel 20, doubling the thickness of bottom panel 20 for added strength and durability.

A hand hole 12 is partially cut out from handle panel 10 and remains attached to handle panel 10 along a fold line 13. This produces a hand guard 18 that is folded through hand hole 12 along fold line 13. The purpose of the hand guard is to protect the user's hand when manually transporting the carrier. The placement of hand hole 12 toward the top of handle panel 10 prevents articles held in the carrier from contacting the user's hand. Hand hole 12 has a generally rectangular shape with rounded ends.

A slot 14 in handle panel 10 is completely cut out. Slot 14 has a generally narrow rectangular shape with rounded ends. Slot 14 facilitates and limits the movement of the components that collapse and expand the carrier.

Figure 5:
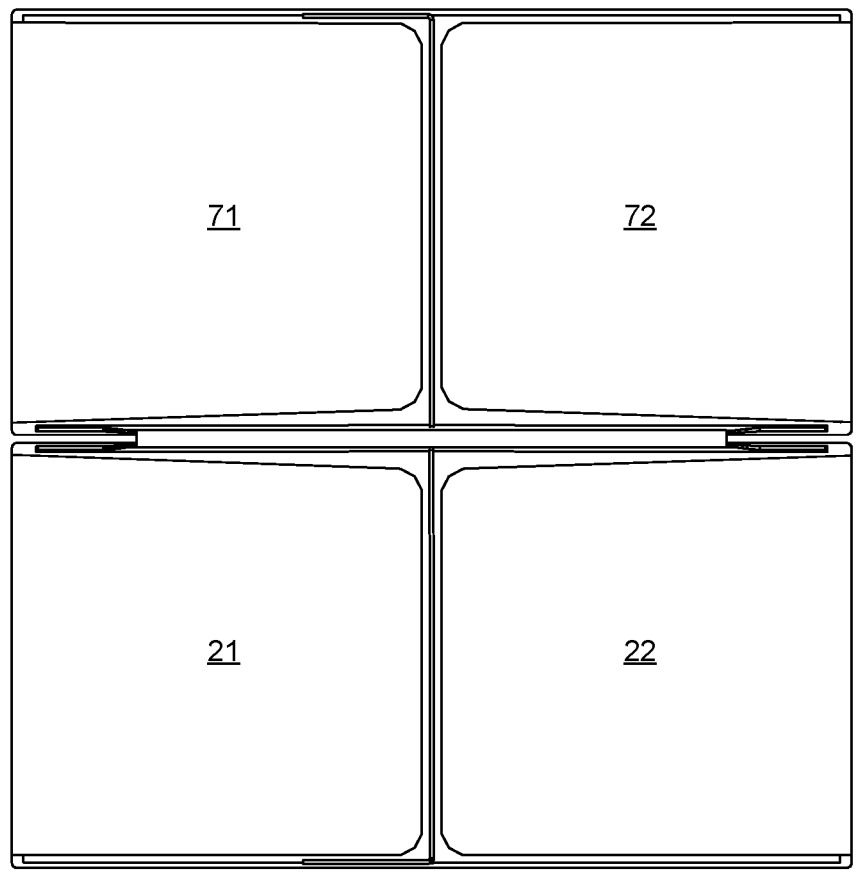
FIG. 5 is a top view of the carrier in its partially expanded state according to one embodiment of the carrier.

Bottom panel 20 is foldably connected to handle panel 10 along fold line 17, to a side reinforcement panel 21 along a fold line 23, to a side reinforcement panel 22 along a fold line 24, and to front panel 30 along a fold line 25. In the expanded state of the carrier, side reinforcement panels 21 and 22 are folded perpendicular to bottom panel 20 along fold lines 23 and 24, respectively, to fit flat against side panels 31, 32, and 33, 34, respectively. In this position, side reinforcement panels 21 and 22 separate handle panel 10 from front panel 30 to hold the carrier in its expanded state. In the collapsed state of the carrier, side reinforcement panels 21 and 22 are folded down to lie flat against bottom panel 20, as shown in FIG. 5.

Figure 9:
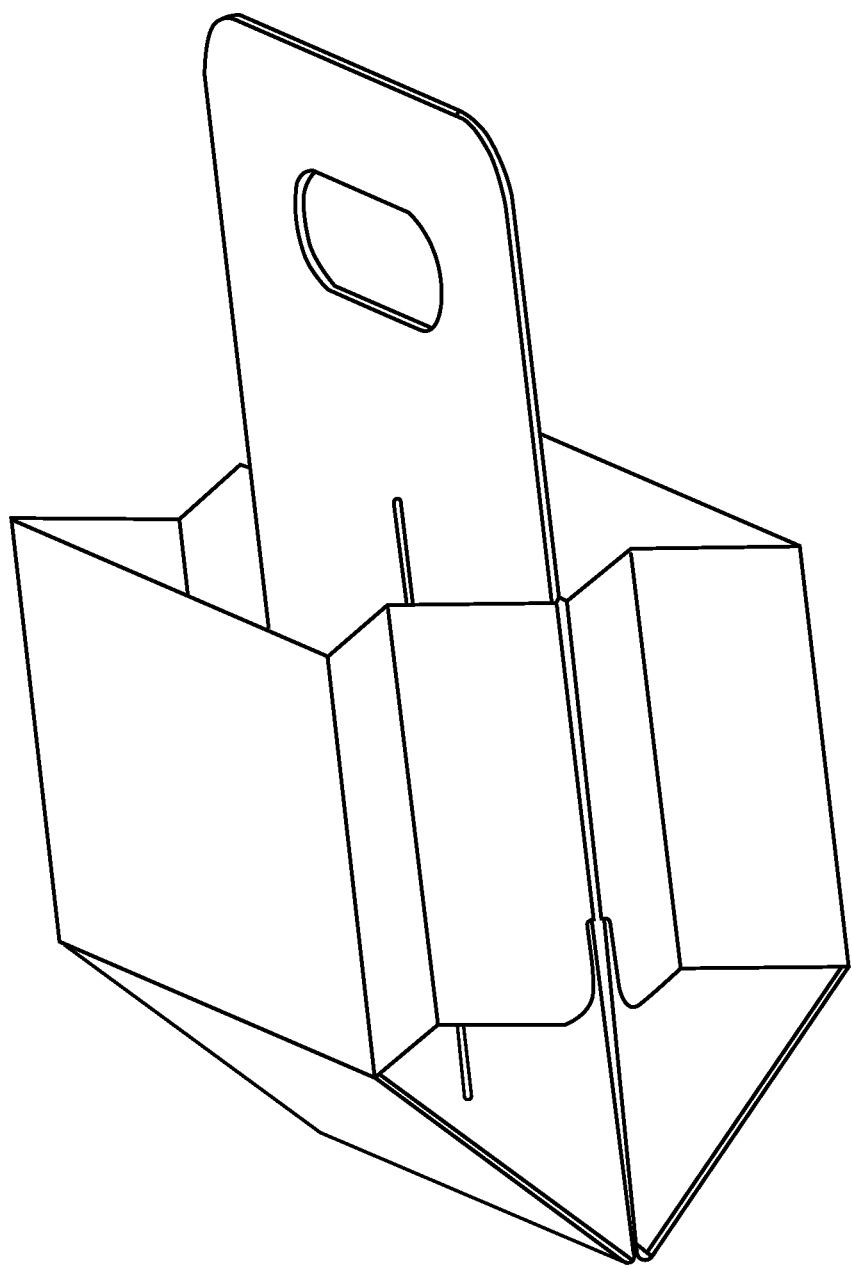
FIG. 9 is a perspective view of the carrier in its partially expanded or partially collapsed state according to one embodiment of the carrier.

Front panel 30 is foldably connected to bottom panel 20 along fold line 25, to side panel 31 along a fold line 45, and to side panel 33 along a fold line 46. Side panel 31 is foldably connected to side panel 32 along score line 44. In the expanded state of the carrier, side panels 31 and 32 are in the same vertical plane, comprising the front half of one side of the carrier. In the collapsed state of the carrier, side panels 31 and 32 are folded against each other in the interior of the carrier along score line 44. Similarly, side panel 33 is foldably connected to side panel 34 along score line 47. In the carrier's expanded state, side panels 33 and 34 are in the same vertical plane, comprising the front half of the other side of the carrier (opposite side panels 31 and 32). In the collapsed state of the carrier, side panels 33 and 34 are folded against each other in the interior of the carrier along score line 47. FIG. 1 illustrates the configuration of the side panels and their score lines when the carrier is expanded. FIG. 9 shows the sides of the carrier collapsing inward. Side panel 34 is foldably connected to a side flap 35 along a fold line 48. During assembly, side flap 35 is inserted between handle panel 10 and handle panel 60.

Side panel 32 is foldably connected to side flap 36 along a fold line 43. Side flap 36 is foldably connected to interior partition panel 37 along a fold line 42. Interior partition panel 37 is foldably connected to interior partition panel 38 along score line 41. Interior partition panel 38 is foldably connected to an interior partition attachment flap 39 along a score line 40. In the assembled carrier, interior partition attachment flap 39 is glued to the center of front panel 30. In the expanded state of the carrier, side flap 36 is inserted between handle panel 10 and handle panel 60. In the expanded state, interior partition panels 37 and 38 are inserted though slot 14 and are in the same vertical plane, forming a partition between the receptacles at the front of the carrier. In the collapsed state of the carrier, interior partition panels 37 and 38 are folded against each other along score line 41.

Description of Section 7

Section 7 of blank 1 in FIG. 2 comprises handle panel 60, a bottom panel 70, back panel 80, and other components foldably connected to these main panels.

Handle panel 60 is foldably connected to handle panel 10 along fold line 61 and to bottom panel 70 along a fold line 67. Fold lines 11 and 61 are adjacent parallel fold lines that foldably connect the handle panels leaving a narrow space between the handle panels 10 and 60 for the insertion of side flaps 35, 36, 85, and 86, which are foldably connected to side panels 34, 32, 84, and 82, respectively. Handle panel 60 is also connected to a bottom reinforcement panel 65 along a cut line 66. During manufacture or assembly, bottom reinforcement panel 65 is severed from handle panel 60 along cut line 66 and glued to the interior surface of bottom panel 70. Hand hole 62 is completely cut out from handle panel 60. A slot 64 in handle panel 60 is completely cut out. Slot 64 facilitates and constrains the movement of the interior partition panels that collapses and expands the carrier.

Bottom panel 70 is foldably connected to handle panel 60 along fold line 67, to a side reinforcement panel 71 along a fold line 73, to a side reinforcement panel 72 along a fold line 74, and to back panel 80 along a fold line 75. In the expanded state of the carrier, side reinforcement panel 71 is folded perpendicular to bottom panel 70 along fold line 73 to fit against side panels 81 and 82, and side reinforcement panel 72 is folded perpendicular to bottom panel 70 along fold line 74 to fit against a side panel 83 and side panel 84. In this position, side reinforcement panels 71 and 72 forcibly separate handle panel 60 from back panel 80 to hold the carrier in its expanded state. In the collapsed state of the carrier, side reinforcement panels 71 and 72 are folded down to lie flat against bottom panel 70, as shown in FIG. 5.

Back panel 80 is foldably connected to bottom panel 70 along fold line 75, to a side panel 81 along a fold line 95, and to side panel 83 along a fold line 96. Side panel 81 is foldably connected to side panel 82 along score line 94. In the expanded state of carrier 4, side panels 81 and 82 are in the same vertical plane, forming the back half of one side of the carrier. In the collapsed state of the carrier, side panels 81 and 82 are folded against each other in the interior of the carrier along score line 94. Similarly, side panel 83 is foldably connected to side panel 84 along a score line 97. In the carrier's expanded state, side panels 83 and 84 are in the same vertical plane, comprising the back half of the side of the other side of the carrier (opposite side panels 81 and 82). In the collapsed state of the carrier, side panels 83 and 84 are folded against each other in the interior of the carrier along score line 97. FIG. 1 illustrates the configuration of the side panels and their score lines when the carrier is in its expanded state. FIG. 9 shows the sides of the carrier collapsing inward. Side panel 84 is foldably connected to a side flap 85 along a fold line 98. During assembly, side flap 85 is inserted between handle panel 10 and handle panel 60.

Side panel 82 is foldably connected to a side flap 86 along a fold line 93. Side flap 86 is foldably connected to an interior partition panel 87 along a fold line 92. Interior partition panel 87 is foldably connected to an interior partition panel 88 along a score line 91. Interior partition panel 88 is foldably connected to an interior partition attachment flap 89 along a score line 90. In the assembled carrier, interior partition panel flap 89 is glued to the center of back panel 80. In the expanded state of the carrier, side flap 86 is inserted between handle panel 10 and handle panel 60. In the expanded state, interior partition panels 87 and 88 are inserted through slot 64 and are in the same vertical plane, forming a partition between the receptacles at the back of the carrier. In the collapsed state of the carrier, interior partition panels 87 and 88 are folded against each other along score line 91. This concludes the description of section 7.

The panels and flaps which comprise blank 1 are rectangular in shape, with several exceptions. The following panels are trapezoidal in shape: side reinforcement panels 21, 22, 71, 72; side flaps 35, 36, 85, 86; interior partition panels 38, 88; and interior partition attachment flaps 39, 89. Several rectangular panels include two rounded corners (handle panels 10 and 60, side reinforcement panels 21, 22, 71, 72). Side panels 32, 34, 82, and 84 include a notch and one rounded corner.

Figure 3:
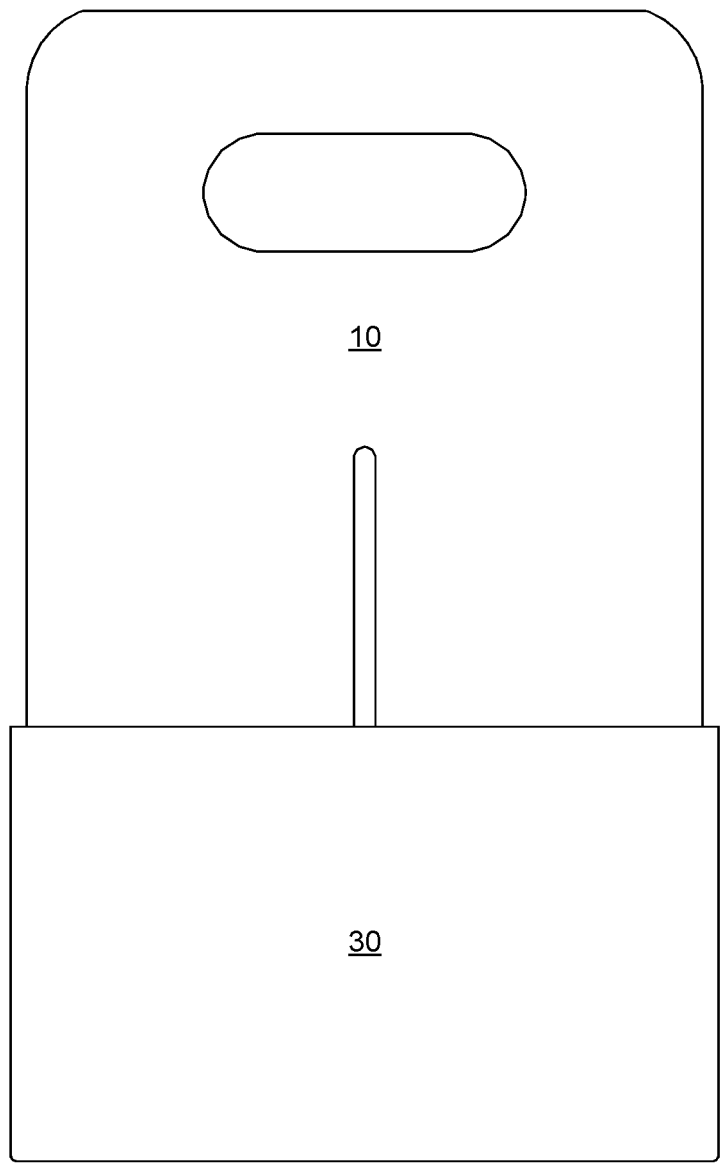
FIG. 3 is a front view of the carrier in its expanded state according to one embodiment of the carrier.

FIG. 3 shows the assembled carrier in front view, showing handle panel 10 and front panel 30. This view illustrates the simplicity of the structure and appearance of the carrier.

Figure 4:
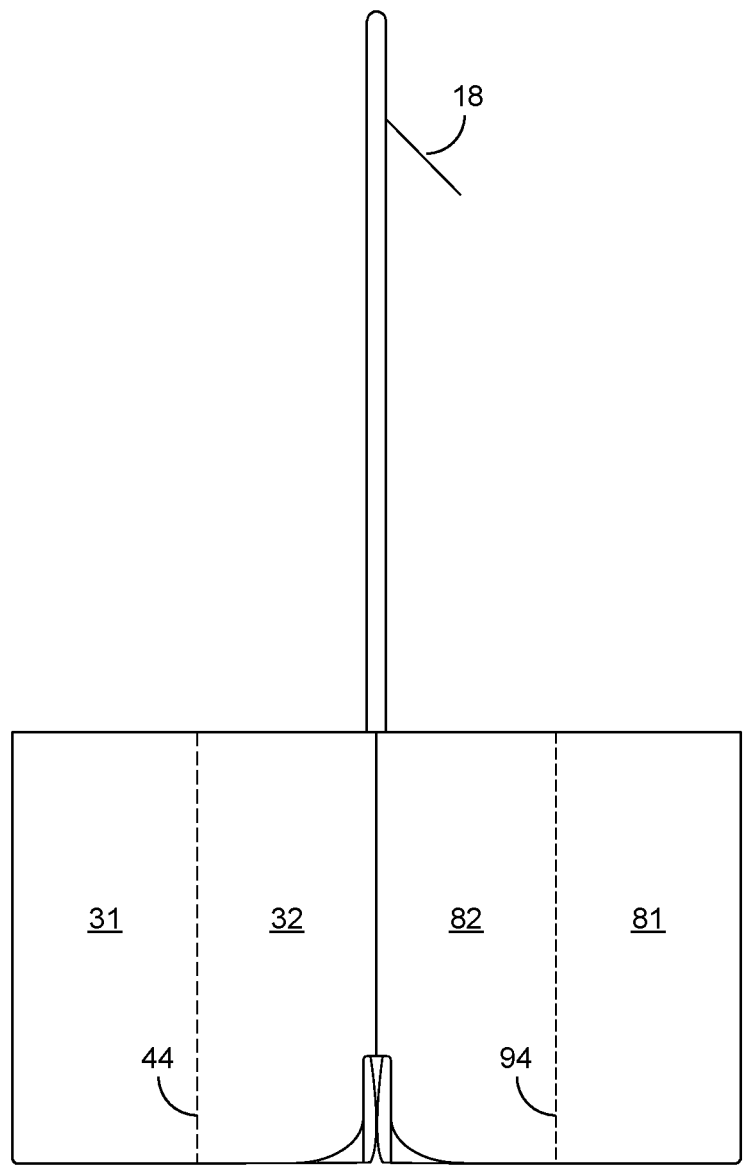
FIG. 4 is a side view of the carrier in its expanded state according to one embodiment of the carrier.

FIG. 4 shows the assembled carrier in side view, showing that side panels 31 and 32 (in section 6 of FIG. 2) and side panels 82 and 81 (in section 7 of FIG. 2) together form one complete side of the carrier. The same configuration applies to the opposite side panels, not shown in this figure. FIG. 4 also shows score lines 44 and 94. In collapsing the assembled carrier, pressure is applied to score lines 44 and 94 on one side of the carrier, and to score lines 47 and 97 on the opposite side of the carrier (score lines 47 and 97 are not visible in FIG. 4). In expanding the carrier, the areas of the carrier where score lines 44, 94, 47, and 97 intersect the top edge of the side panels are pulled outward. FIG. 4 also shows guard 18, which protects the user's hand when lifting and carrying the carrier.

FIG. 5 shows the assembled carrier 4 from the top with the side reinforcement panels 21, 22, 71, and 72 folded down against the bottom reinforcement panels, where the side reinforcement panels are located after the first step of expanding the carrier and before the side reinforcement panels 21, 22, 71, and 72 are folded upward to maintain the structure of the expanded carrier. In the figure, handle panels 10 and 60 bisect the square space of the receptacle area created by assembly of sections 6 and 7 of blank 1. Interior partition panels 37 and 38 bisect the receptacle area formed from section 6 of blank 1 and interior partition panels 87 and 88 bisect the receptacle area formed from section 7 of blank 1.

Figure 6:
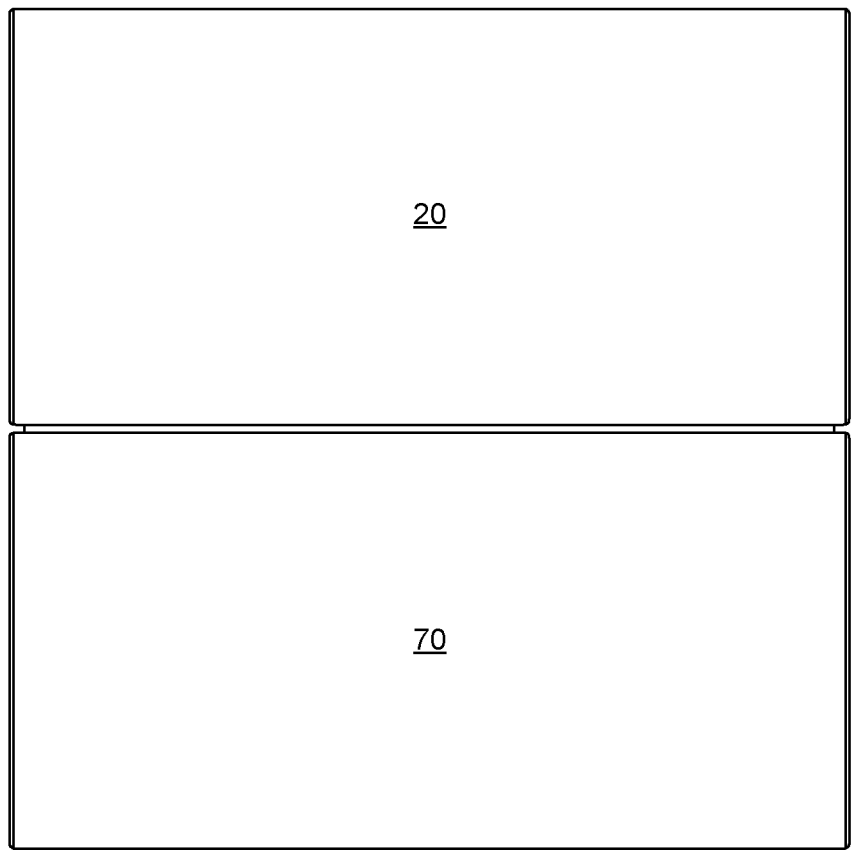
FIG. 6 is a bottom view of the carrier in its expanded state according to one embodiment of the carrier.

FIG. 6 shows the assembled carrier from the bottom illustrating that bottom panels 20 and 70 together form the bottom of the carrier.

Figure 7:
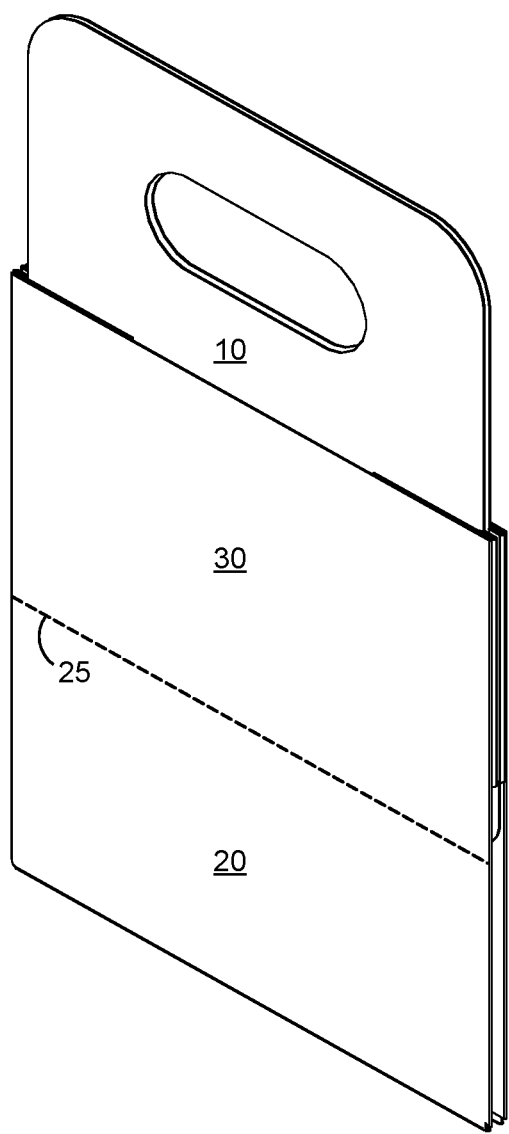
FIG. 7 is a perspective view of the carrier in its collapsed state according to one embodiment of the carrier.

FIG. 7 shows the collapsed carrier in a perspective view, illustrating how front panel 30 and bottom panel 20 fold along fold line 25 to lie in the same plane against handle panel 10. This forms a compact flat structure that allows the container to be conveniently stored between uses. Handle panel 60, back panel 80, and bottom panel 70, not shown in this view, form the same configuration on the opposite section of the carrier.

Figure 8:
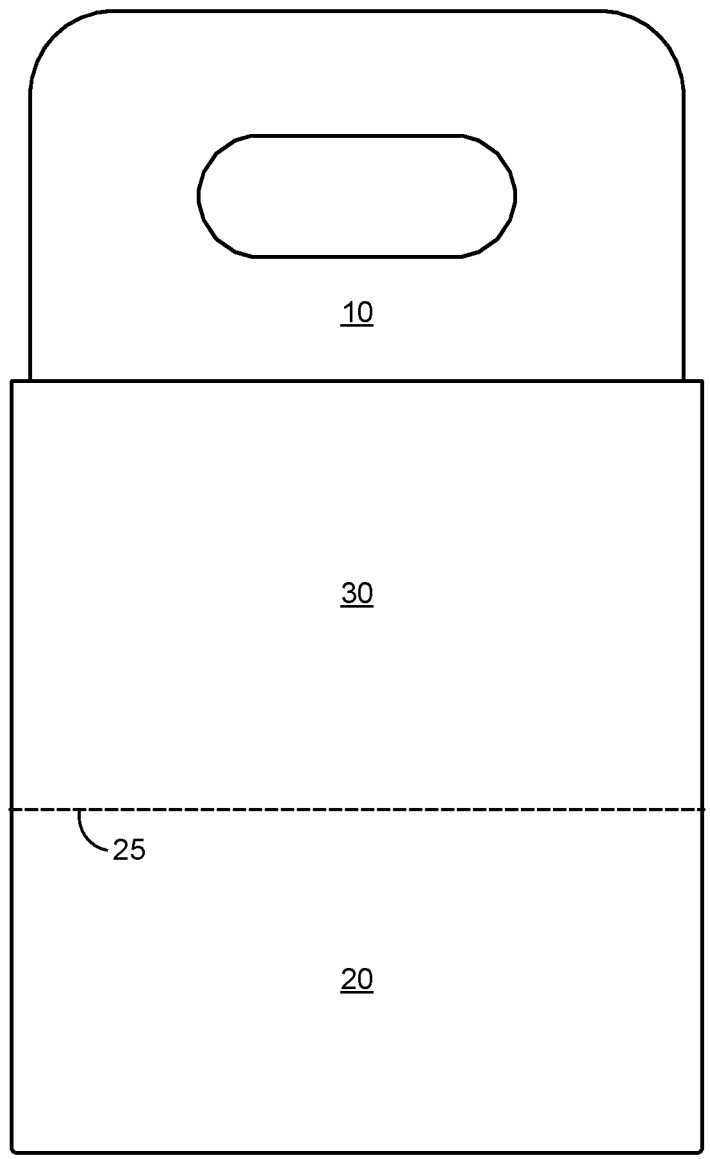
FIG. 8 is a front view of the carrier in its collapsed state according to one embodiment of the carrier.

FIG. 8 shows the collapsed carrier from the front, illustrating the simplicity of the structure when the carrier is collapsed. FIG. 8 depicts handle panel 10, front panel 30, bottom panel 20, and fold line 25.

FIG. 9 shows the carrier during the process of being collapsed, with the side panels collapsing inward along fold lines and score lines, and the bottom panels moving toward one another to flatten the structure.

Assembly

The carrier is assembled as follows. Bottom reinforcement panel 15 is severed from handle panel 10 along cut line 16, aligned with bottom panel 20, and glued to the upper (the surface located in the interior of the assembled carrier) surface of bottom panel 20, so that the bottom reinforcement panel is attached to the interior of the carrier. Similarly, bottom reinforcement panel 65 is severed from handle panel 60 along cut line 66, aligned with bottom panel 70, and glued to the upper surface of bottom panel 70, so that the bottom reinforcement panel is attached to the interior of the carrier. Alternatively, the bottom reinforcement panels are glued to the bottom panels at another stage of manufacture or assembly.

The interior portion of slot 14 is removed from handle panel 10; the interior portion of slot 64 is removed from handle panel 60; and the interior portion of hand hole 62 is removed from handle panel 60. The hand guard 18 remains in hand hole 12 in handle panel 10, attached along fold line 13, to be folded along fold line 13 when the carrier is in use. Alternatively, the interior portions of the slots and hand hole are removed at another stage of manufacture or assembly.

Folding Procedure

Blank 1 as shown in FIG. 2 is folded in half along two adjacent parallel fold lines 11 and 61, leaving the long edges of handle panel 10 and handle panel 60 aligned with each other and leaving the edges of slot 14 and slot 64 aligned with each other.

The following steps of assembly assume the blank 1 folded along fold lines 11 and 61 is viewed in a vertical position with the fold lines 11 and 61 at the top of the folded blank. The description of the folding steps begins with steps performed on section 6, followed by identical steps performed on section 7. Glue applications noted in the following paragraphs are presented in more detail in the "Glue Applications" section.

Bottom panel 20 is folded upward along fold line 17 into a position perpendicular to handle panel 10. Side reinforcement panels 21 and 22 are folded upward perpendicular to bottom panel 20 along fold lines 23 and 24. Front panel 30 is then folded perpendicular to bottom panel 20 along fold line 25 in the direction of the top of handle panel 10, so that handle panel 10 and front panel 30 are parallel to each other and perpendicular to bottom panel 20.

Foldably connected side panels 31, 32, along with side flap 36, foldably connected interior partition panels 37, 38, and interior partition attachment flap 39, are folded perpendicular to front panel 30 along fold line 45 toward handle panel 10. Side reinforcement panel 21 is thus positioned adjacent to side panels 31, 32. Similarly, foldably connected side panels 33, 34, along with side flap 35, are folded perpendicular to front panel 30 along fold line 46 toward handle panel 10. Side reinforcement panel 22 is now positioned adjacent to side panels 33, 34.

Side flap 36, along with interior partition panels 37 and 38 and interior partition attachment flap 39, is folded perpendicular to side panel 32 at fold line 43 toward handle panel 10 and inserted into the space between handle panel 10 and handle panel 60. Interior partition panel 37, along with interior partition panel 38 and interior partition attachment flap 39, is folded perpendicular to side flap 36 at fold line 42 and inserted through slot 14. Thus, interior partition panels 37, 38, along with interior partition attachment flap 39 emerge from the space between the handle panels 10 and 60 through slot 14 into the space between handle panel 10 and front panel 30. Interior partition attachment flap 39 is folded perpendicular to interior partition panel 38 in either direction at score line 40 and glued to the vertical center of the interior surface of front panel 30. This step creates two receptacles of equal size in the half of the carrier assembled from section 6 and stabilizes the interior partition.

Side flap 35 is folded perpendicular to side panel 34 at fold line 48 toward handle panel 10 and inserted into the space between handle panel 10 and handle panel 60. Side flap 35 is glued to side flap 36 to stabilize the side flaps in the space between the handle panels. This completes the assembly of section 6.

Turning now to the assembly of section 7, steps similar to those detailed above for section 6 are performed. Bottom panel 70 is folded upward along fold line 67 into a position perpendicular to handle panel 60. Side reinforcement panels 71 and 72 are folded upward perpendicular to bottom panel 70 along fold lines 73 and 74 toward handle panel 60. Back panel 80 is then folded perpendicular to bottom panel 70 along fold line 75 in the direction of handle panel 60, so that handle panel 60 and back panel 80 are parallel to each other and perpendicular to bottom panel 70, forming a receptacle at the back of the carrier.

Foldably connected side panels 81, 82, along with side flap 86, interior partition panels 87, 88, and interior partition attachment flap 89 are folded perpendicular to back panel 80 along fold line 95 toward handle panel 60. Side reinforcement panel 71 is thus positioned adjacent to side panels 81, 82. Similarly, foldably connected side panels 83, 84, along with side flap 85, are folded perpendicular to back panel 80 along fold line 96 toward handle panel 60. Side reinforcement panel 72 is thus positioned adjacent to side panels 83, 84.

Side flap 86, along with interior partition panels 87 and 88 and interior partition attachment flap 89, is folded perpendicular to side panel 82 at fold line 93 toward handle panel 60 and inserted into the space between handle panel 10 and handle panel 60. Interior partition panel 87, along with interior partition panel 88 and interior partition attachment flap 89, is folded perpendicular to side flap 86 at fold line 92 and inserted through slot 64. Thus, interior partition panels 87, 88 emerge from the space between the handle panels 10 and 60 into the space between handle panel 60 and back panel 80. Interior partition attachment flap 89 is folded perpendicular to interior partition panel 88 in either direction at score line 90 and glued to the center of the interior surface of back panel 80. This step creates two receptacles of equal size in the half of the carrier assembled from section 7 and stabilizes the interior partition panels. The attachment of interior partition attachment flap 89 to back panel 80 (along with a similar step applied to section 6) provides, in part, the basis for the umbrella-type action that expands and collapses the carrier.

Side flap 85 is folded perpendicular to side panel 84 at fold line 98 toward handle panel 60 and inserted into the space between handle panel 10 and handle panel 60. Side flap 85 is glued to side flap 86 to stabilize the side flaps in the space between the handle panels. This completes the assembly of section 7.

At this point, section 6 and section 7 of blank 1 comprise two identical structures (except that hand hole 12 has hand guard 18 foldably attached to it while hand hole 62 is empty) connected along adjacent parallel fold lines 11 and 61.

Glue Applications

During the process of assembling the carrier, four sets of glue applications are performed. The sets of glue applications are preferably performed in the sequence specified below.

The first set of glue applications adheres the bottom reinforcement panels 15 and 65 to the bottom panels 20 and 70. The severed bottom reinforcement panel 15 is adhered to the upper surface (the surface located in the interior of the assembled carrier) of bottom panel 20. The severed bottom reinforcement panel 65 is adhered to the upper surface of bottom panel 70. This step can be completed before any folding step has been performed or at another point during assembly. The bottom reinforcement panels strengthen the bottom panels so the carrier securely bears the weight of the articles to be carried.

The second set of glue applications adheres interior partition attachment flaps 39 and 89 to the interior surfaces of front panel 30 and back panel 80, respectively. During assembly of section 6, after the interior partition panels 37 and 38 along with interior partition attachment flap 39 have been passed between handle panels 10 and 60 and through slot 14, one surface of interior partition attachment flap 39 is adhered to the interior surface of front panel 30 so that score line 40 aligns with the exact center of front panel 30 and is positioned some distance below the top edge of front panel 30. During assembly of section 7, after the interior partition panels 87 and 88 along with interior partition attachment flap 89 have been passed between handle panels 10 and 60 and through slot 64, one surface of interior partition attachment flap 89 is adhered to the interior surface of back panel 80 so that score line 90 aligns with the exact center of back panel 80 and is positioned some distance below the top edge of back panel 80. The adhesion of interior partition attachment flap 39 to front panel 30 and of interior partition attachment flap 89 to back panel 80 serves to hold the handle, bottom, front, and back panels in their relative positions during the remaining steps of assembly. It also provides, in part, the basis for the umbrella-type action that expands and collapses the carrier. This second set of glue applications precedes the third and fourth sets of glue applications.

The third set of glue applications adheres side flaps 35 and 36 of section 6 to each other and also adheres side flaps 85 and 86 of section 7 to each other. During assembly of section 6, after interior partition attachment flap 39 is adhered to the interior surface of front panel 30, side flap 36 lies flat against handle panel 10 in the space between handle panels 10 and 60. Side flap 35 is positioned perpendicular to side panel 34 at fold line 48 in the space between the handle panels. An area of side flap 35 near the narrower vertical edge of side flap 35 is adhered to an area of side flap 36 near the narrower vertical edge of side flap 36. During assembly of section 7, after interior partition attachment flap 89 is adhered to the interior surface of back panel 80, side flap 86 lies flat against handle panel 60 in the space between the handle panels. Side flap 85 is folded perpendicular to side panel 84 at fold line 98 and positioned in the space between the handle panels. An area of side flap 85 near the narrower vertical edge of side flap 85 is adhered to an area of side flap 86 near the narrower vertical edge of side flap 86. This glue application can be performed on section 6 and section 7 in any order. This third set of glue applications precedes the fourth set of glue applications.

When the first three sets of glue applications are completed, the front half of the carrier formed from section 6 of blank 1 and the back half of the carrier formed from section 7 are connected along parallel fold lines 11 and 61. The handle panels 10 and 60 and their attached receptacle components can be moved apart and together by means of this hinged connection to accommodate the fourth and final set of glue applications, which adheres section 6 to section 7.

In the fourth set of glue applications, the two halves of the carrier are connected by adhering side flaps 35 and 36 of section 6 to side flaps 85 and 86 of section 7 and by adhering the interior surface of handle panel 10 to the interior surface of handle panel 60. Side flap 36 and side flap 86 are adhered to each other while they are positioned and aligned in the space between handle panels 10 and 60. Side flap 36 and side flap 86 are adhered at an area located along their wider vertical edges; fold lines 43 and 93 are thus aligned with each other. Side flap 35 and side flap 85 are adhered at an area located along their wider vertical edges; fold lines 48 and 98 are thus aligned with each other. At the same time, handle panel 10 and handle panel 60 are adhered at an area located above fold line 17 of handle panel 10 and above fold line 67 of handle panel 60. The three applications described in this paragraph are made simultaneously.

When the final set of glue applications is complete, sections 6 and 7 of the carrier are sealed together and movement along the hinge formed by handle fold lines 11 and 61 is no longer possible. The assembled carrier can be converted from its expanded state to its collapsed state and from its collapsed state to its expanded state as described in the section "Operation" which follows.

As a final step of assembly of the carrier, each of the four side reinforcement panels 21, 22, 71, and 72 is folded upward to lie flat against the respective side panels. In this position the edge of each side reinforcement panel exerts pressure on the handle panel. This pressure serves to maintain the carrier in its expanded state. Hand guard 18 is folded along fold line 13. The lifting of the side reinforcement panels completes the assembly of the carrier shown in FIG. 1.

Operation

Collapsing the Carrier

The carrier is converted from the expanded state shown in FIG. 1 to the collapsed state shown in FIG. 7 by means of the following two-step method.

In the first step, the side reinforcement panels are folded down against the bottom reinforcement panels. Side reinforcement panels 21 and 22 are folded down against bottom reinforcement panel 15. Side reinforcement panels 71 and 72 are folded down against bottom reinforcement panel 65. This first step allows each foldably connected pair of side panels to fold inward along score lines in the second step. The side reinforcement panels can be folded down in any order. FIG. 5 shows the carrier from a top view after the side reinforcement panels 21, 22, 71, and 72 have been folded down to lie flat against the bottom reinforcement panels.

In the second step of collapsing the carrier, pressure is applied along the midpoints of side panel score lines 44, 47, 94, and 97, pressing inward toward the center of the carrier. This can be accomplished by placing the thumb of the right hand on score line 44, the fingers of the right hand on score line 94, the thumb of the left hand on score line 47, and the fingers of the left hand on score line 97, and pressing inward. This pressure causes side panels 31 and 32 to fold against each other along score line 44 and side panels 33 and 34 to fold against each other along score line 47. Similarly, the pressure causes side panels 81 and 82 to fold against each other along score line 94 and side panels 83 and 84 to fold against each other along score line 97. The same pressure causes interior partition panels 37 and 38 to fold along score line 41 and interior partition panels 87 and 88 to fold along score line 91. The pressure also causes the interior partition panels 37 and 38, along with side flap 36 and 35, to slide in an upward direction constrained by the top of slot 14. Similarly, the pressure causes interior partition panels 87 and 88, along with side flap 86, to slide in an upward direction constrained by the top of slot 64. The pressure simultaneously causes bottom panel 20 to rotate downward along fold line 25 until bottom panel 20 is in the same plane as front panel 30. The pressure also causes bottom panel 70 to rotate downward along fold line 75 until it is in the same plane as back panel 80. FIG. 9 illustrates the partially collapsed carrier. When the described steps are performed, the carrier is fully collapsed. FIG. 7 shows the fully collapsed carrier in a perspective view, illustrating handle panel 10, front panel 30, bottom panel 20, and fold line 25. FIG. 8 shows the fully collapsed carrier in a front view, illustrating handle panel 10, front panel 30, bottom panel 20, and fold line 25.

Expanding the Carrier

The carrier is converted from the collapsed state shown in FIG. 7 to the expanded state shown in FIG. 1 by means of the following two-step method, which generally reverses the steps of collapsing the carrier.

In the first step, the side panels are pulled outward from their folded state so that each pair of side panels is in the same plane. An outward pressure is applied at the tops of side panel score lines 44, 47, 94, and 97, pulling the side panels outward away from the vertical center of the carrier. This can be accomplished by placing the thumb and forefinger of each hand at the top of the side panel score line and pulling outward until each pair of side panels is no longer folded along the score lines. This outward movement of the side panels causes interior partition panels 37 and 38 to unfold along score line 41 and interior partition panels 87 and 88 to unfold along score line 91. The pressure also causes the interior partition panels 37 and 38 to slide downward constrained by the bottom of slot 14, and interior partition panels 87 and 88 to slide downward constrained by the bottom of slot 64. The pressure simultaneously causes bottom panel 20 to rotate upward along fold line 25 until bottom panel 20 is perpendicular to front panel 30. The pressure also causes bottom panel 70 to rotate upward along fold line 75 until it is perpendicular to back panel 80.

In the second step, the side reinforcement panels 21, 22, 71, and 72 are lifted and folded up against the side panels 31 and 32, 33 and 34, 81 and 82, and 83 and 84, respectively. Each side reinforcement panel is held in place by the precise fit between the edge of the side reinforcement panel adjacent to the handle panel and the handle panel. After these two steps are completed, the carrier is fully expanded for use in receiving and carrying containers or other articles.

In referring to the process of collapsing and expanding the carrier as an "umbrella-type" action, it is suggested that (1) the pair of handle panels 10 and 60 corresponds to the central shaft of an umbrella; (2) the front, back, and bottom panels 30, 80, 20, and 70 correspond to the ribs of the umbrella; and (3) the pairs of foldably connected side panels 31 and 32, 33 and 34, 81 and 82, and 83 and 84 and the foldable interior partition panels 37 and 38, and 87 and 88 correspond to the stretchers of the umbrella. The resemblance between the operation of the carrier and the operation of an umbrella is apparent when the carrier is held upside down and expanded and collapsed in this position.

Although the invention has been explained in relation to its first embodiment, it is to be understood that many other possible modifications and variations can be made without departing from the spirit and scope of the invention.

LIST OF REFERENCE NUMERALS 1 blank
4 carrier
5 midline of blank
6 section of blank
7 section of blank
10 handle panel
11, 13, 17, 23, 24, 25, 42, 43, 45, 46, 48 fold lines
12 hand hole
14 slot
15 bottom reinforcement panel
16 cut line
18 hand guard
20 bottom panel
21, 22 side reinforcement panel
30 front panel
31 through 34 side panels
35, 36 side flaps
37, 38 interior partition panels
39 interior partition attachment flap
40, 41, 44, 47 score lines
60 handle panel
61, 67, 73, 74, 75, 92, 93, 95, 96, 98 fold lines
62 hand hole
64 slot
65 bottom reinforcement panel
66 cut line
70 bottom panel
71, 72 side reinforcement panels
80 back panel
81 through 84 side panels
85, 86 side flaps
87, 88 interior partition panels
89 interior partition attachment flap
90, 91, 94, 97 score lines

What is claimed is:

1. A carrier comprising:
a pair of handle panels comprising slots, each handle panel of the pair of handle panels having at least one slot, the pair of handle panels sharing an upper edge and folded together, providing a space between the pair of handle panels;
a first bottom panel connected to and foldable with respect to a first handle panel of the pair of handle panels;
a second bottom panel connected to and foldable with respect to a second handle panel of the pair of handle panels;
a front panel connected to and foldable with respect to the first bottom panel;
a back panel connected to and foldable with respect to the second bottom panel;
a first foldable side panel pair that share a first foldable edge, and are connected to and at least partially foldable with respect to the front panel;
a second foldable side panel pair that share a second foldable edge, and are connected to and at least partially foldable with respect to the back panel;
a third foldable side panel pair that share a third foldable edge, and are connected to and at least partially foldable with respect to the front panel;
a fourth foldable side panel pair that share a fourth foldable edge, and are connected to and at least partially foldable with respect to the back panel;
a first side flap in the space between the pair of handle panels, the first side flap connected to and foldable with respect to a side panel of the first foldable side panel pair;
a second side flap in the space between the pair of handle panels, the second side flap connected to and foldable with respect to a side panel of the second foldable side panel pair;
a third side flap in the space between the pair of handle panels, the third side flap connected to and foldable with respect to a side panel of the third foldable side panel pair;

a fourth side flap in the space between the pair of handle panels, the fourth side flap connected to and foldable with respect to a side panel of the fourth foldable side panel pair;

a first interior partition panel pair that share a first interior partition panel foldable edge, and are connected to and at least partially foldable with respect to the first side flap, the first interior partition panel pair dimensioned to fit through at least one of the slots of the pair of handle panels;

a second interior partition panel pair that share a second foldable interior partition panel edge, and are connected to and at least partially foldable with respect to the second side flap, the second interior partition panel pair dimensioned to fit through at least one of the slots of the pair of handle panels;

a first interior partition attachment flap connected to and at least partially foldable with respect to the first interior partition panel pair, the first interior partition attachment flap affixed to the front panel; and a second interior partition attachment flap connected to and at least partially foldable with respect to the second interior partition panel pair, the second interior partition attachment flap affixed to the back panel;

wherein the carrier is configured to fold and unfold between a collapsed form and a expanded form.

2. The carrier of claim 1, wherein the carrier is made of corrugated fiberboard, foldable plastic material, or other foldable material.

3. The carrier of claim 1, the carrier further comprising printing or coating applied to at least one surface region of the carrier.

4. The carrier of claim 1, wherein the carrier folds into the collapsed form when the first interior partition panel pair and the second interior partition panel pair move towards the upper edge of the pair of handle panels, and wherein the carrier unfolds into the expanded form when the first interior partition panel pair and the second interior partition panel pair move away from the upper edge of the pair of handle panels.

5. The carrier of claim 1, wherein the pair of handle panels further comprises openings dimensioned to fit a hand of a user.

6. The carrier of claim 1, the carrier further comprising:
a first side reinforcement panel and a second side reinforcement panel, both connected to and foldable with respect to the first bottom panel, the first side reinforcement panel connected at a first end of the first bottom panel and the second side reinforcement panel connected at a second end of the first bottom panel that is distal to the first end of the first bottom panel; and
a third side reinforcement panel and a fourth side reinforcement panel, both connected to and foldable with respect to the second bottom panel, the third side reinforcement panel connected at a first end of the second bottom panel and the second side reinforcement panel connected at a second end of the second bottom panel that is distal to the first end of the second bottom panel.

7. The carrier of claim 6, the carrier further comprising:
a first bottom reinforcement panel affixed to the first bottom panel; and
a second bottom reinforcement panel affixed to the second bottom panel.

8. The carrier of claim 6, wherein the carrier folds into the collapsed form when the first interior partition panel pair and the second interior partition panel pair move towards the upper edge of the pair of handle panels, and wherein the carrier unfolds into the expanded form when the first interior partition panel pair and the second interior partition panel pair move away from the upper edge of the pair of handle panels.

9. The carrier of claim 6, wherein the pair of handle panels further comprises openings dimensioned to fit a hand of a user.

10. The carrier of claim 8, wherein the pair of handle panels further comprises openings dimensioned to fit a hand of a user.

11. A blank for forming a collapsible container carrier comprising:
a pair of handle panels comprising slots, each handle panel of the pair of handle panels having at least one slot, the pair of handle panels sharing an upper edge and foldable at the upper edge;
a first bottom panel connected to and foldable with respect to a first handle panel of the pair of handle panels;
a second bottom panel connected to and foldable with respect to a second handle panel of the pair of handle panels;
a front panel connected to and foldable with respect to the first bottom panel;
a back panel connected to and foldable with respect to the second bottom panel;
a first foldable side panel pair that share a first foldable edge, and are connected to and at least partially foldable with respect to the front panel;
a second foldable side panel pair that share a second foldable edge, and are connected to and at least partially foldable with respect to the back panel;
a third foldable side panel pair that share a third foldable edge, and are connected to and at least partially foldable with respect to the front panel;
a fourth foldable side panel pair that share a fourth foldable edge, and are connected to and at least partially foldable with respect to the back panel;
a first side flap connected to and foldable with respect to a side panel of the first foldable side panel pair;
a second side flap connected to and foldable with respect to a side panel of the second foldable side panel pair;
a third side flap connected to and foldable with respect to a side panel of the third foldable side panel pair;
a fourth side flap connected to and foldable with respect to a side panel of the fourth foldable side panel pair;
a first interior partition panel pair that share a foldable edge, and are connected to and at least partially foldable with respect to the first side flap, the first interior partition panel pair dimensioned to fit through at least one of the slots of the pair of handle panels;
a second interior partition panel pair that share a foldable edge, and are connected to and at least partially foldable with respect to the second side flap, the second interior partition panel pair dimensioned to fit through at least one of the slots of the pair of handle panels;
a first interior partition attachment flap connected to and at least partially foldable with respect to the first interior partition panel pair, the first interior partition attachment flap configured to attach to the front panel; and
a second interior partition attachment flap connected to and at least partially foldable with respect to the second interior partition panel pair, the second interior partition attachment flap configured to attach to the back panel.

12. The blank of claim 11, wherein the pair of handle panels is configured to form a space between the pair of handle panels when the pair of handle panels is folded together by the upper edge.

13. The blank of claim 12, wherein each of the first side flap, the second side flap, the third side flap, and the fourth side flap are dimensioned to fit in the space between the pair of handle panels.

14. The blank of claim 11, wherein the first side flap is dimensioned to align the connection between the first side flap and the first interior partition panel pair with a first slot of the slots when the first side flap is folded and located in the space between the pair of handle panels; and wherein the second side flap is dimensioned to align the connection between the second side flap and the second interior partition panel pair with a second slot of the slots when the second side flap is folded and located in the space between the pair of handle panels.

15. The blank of claim 13, wherein the first side flap is further dimensioned to align the connection between the first side flap and the first interior partition panel pair with a first slot of the slots when the first side flap is folded and located in the space between the pair of handle panels; and wherein the second side flap is further dimensioned to align the connection between the second side flap and the second interior partition panel pair with a second slot of the slots when the second side flap is folded and located in the space between the pair of handle panels.

16. The blank of claim 13, wherein the first slot is aligned with the second slot when the pair of handle panels is folded together by the upper edge.

17. The blank of claim 15, wherein the first slot is aligned with the second slot when the pair of handle panels is folded together by the upper edge.

18. The blank of claim 11, wherein a first bottom reinforcement panel is connected to the first handle panel and a second bottom reinforcement panel is connected to the second handle panel; wherein the first bottom reinforcement panel is detachable from the first handle panel and the second bottom reinforcement panel is detachable from the second handle panel; and wherein the first bottom reinforcement panel is configured to be affixed to the first bottom panel and the second bottom reinforcement panel is configured to be affixed to the second bottom panel.

19. The blank of claim 13, wherein a first bottom reinforcement panel is connected to the first handle panel and a second bottom reinforcement panel is connected to the second handle panel; wherein the first bottom reinforcement panel is detachable from the first handle panel and the second bottom reinforcement panel is detachable from the second handle panel; and wherein the first bottom reinforcement panel is configured to be affixed to the first bottom panel and the second bottom reinforcement panel is configured to be affixed to the second bottom panel.

20. A method for forming a collapsible container carrier comprising the steps of:
folding a pair of handle panels together by an upper edge shared by the pair of handle panels, the folding of the pair of handle panels forming a space between the pair of handle panels;
folding a first bottom panel connected to and foldable with respect to a first handle panel of the pair of handle panels, the folding approximately perpendicular to the first handle panel and away from the space between the pair of handle panels, wherein the first handle panel comprises a first slot;
folding a second bottom panel connected to and foldable with respect to a second handle panel of the pair of handle panels, the folding approximately perpendicular to the second handle panel and away from the space between the pair of handle pane, wherein the second handle panel comprises a second slot;
folding a front panel connected to and foldable with respect to the first bottom panel, the folding approximately perpendicular to the first bottom panel and toward the upper edge of the pair of handle panels;
folding a back panel connected to and foldable with respect to the second bottom panel, the folding approximately perpendicular to the second bottom panel and toward the upper edge of the pair of handle panels;
folding a first foldable side panel pair that share a first foldable edge, and are connected to and at least partially foldable with respect to the front panel, the folding approximately perpendicular to the front panel and toward the pair of handle panels;
folding a second foldable side panel pair that share a second foldable edge, and are connected to and at least partially foldable with respect to the back panel, the folding approximately perpendicular to the back panel and toward the pair of handle panels;
folding a third foldable side panel pair that share a first foldable edge, and are connected to and at least partially foldable with respect to the front panel, the folding approximately perpendicular to the front panel and toward the pair of handle panels;
folding a fourth foldable side panel pair that share a fourth foldable edge, and are connected to and at least partially foldable with respect to the back panel, the folding approximately perpendicular to the back panel and toward the pair of handle panels;
folding a first side flap connected to and foldable with respect to a side panel of the first foldable side panel pair, the folding approximately perpendicular to the first foldable side panel pair and towards the space between the pair of handle panels;
folding a second side flap connected to and foldable with respect to a side panel of the second foldable side panel pair, the folding approximately perpendicular to the second foldable side panel pair and towards the space between the pair of handle panels;
folding a third side flap connected to and foldable with respect to a side panel of the third foldable side panel pair, the folding approximately perpendicular to the third foldable side panel pair and towards the space between the pair of handle panels;
folding a fourth side flap connected to and foldable with respect to a side panel of the fourth foldable side panel pair, the folding approximately perpendicular to the fourth foldable side panel pair and towards the space between the pair of handle panels;
folding a first interior partition panel pair that share a first interior partition panel foldable edge, and is connected to and at least partially foldable with respect to the first side flap, the folding approximately perpendicular to the first side flap and towards the front panel;
folding a second interior partition panel pair that share a second interior partition panel foldable edge, and is connected to and at least partially foldable with respect to the second side flap, the folding approximately perpendicular to the second side flap and towards the back panel;
inserting the first side flap into the space between the pair of handle panels;

inserting the second side flap into the space between the pair of handle panels;
inserting the third side flap into the space between the pair of handle panels;
inserting the fourth side flap into the space between the pair of handle panels;
inserting the first interior partition panel pair from the space between the pair of handle panels through the first slot;
inserting the second interior partition panel pair from the space between the pair of handle panels through the second slot;
attaching a first interior partition attachment flap to the front panel, the first interior partition attachment flap connected to and at least partially foldable with respect to the first interior partition panel pair; and
attaching a second interior partition attachment flap to the back panel, the second interior partition attachment flap connected to and at least partially foldable with respect to the second interior partition panel pair.

21. The method of step 20 further comprising the steps of:
detaching a first bottom reinforcement panel connected to the first handle panel;
detaching a second bottom reinforcement panel connected to the second handle panel;
affixing the first bottom reinforcement panel to the first bottom panel; and
affixing the second bottom reinforcement panel to the second bottom panel.

\* \* \* \* \*